United States Patent
Nakagawa (10) Patent No.: US 8,695,660 B2
(45) Date of Patent: Apr. 15, 2014

(54) PNEUMATIC TIRE FOR MOTORCYCLE

(75) Inventor: Hidemitsu Nakagawa, Saitama (JP)

(73) Assignee: Bridgestone Corporation, Tokyo (JP)

( * ) Notice: Subject to any disclaimer, the term of this patent is extended or adjusted under 35 U.S.C. 154(b) by 142 days.

(21) Appl. No.: 12/681,230

(22) PCT Filed: Aug. 21, 2008

(86) PCT No.: PCT/JP2008/064873
§ 371 (c)(1), (2), (4) Date: Apr. 20, 2010

(87) PCT Pub. No.: WO2009/044590
PCT Pub. Date: Apr. 9, 2009

(65) Prior Publication Data
US 2010/0236677 A1 Sep. 23, 2010

(30) Foreign Application Priority Data
Oct. 4, 2007 (JP) ................................. 2007-261143

(51) Int. Cl.
*B60C 1/00* (2006.01)
*B60C 11/00* (2006.01)

(52) U.S. Cl.
USPC .................................... 152/209.5; 152/209.11

(58) Field of Classification Search
USPC .......................................... 152/209.5, 209.11
See application file for complete search history.

(56) References Cited

U.S. PATENT DOCUMENTS

| 6,302,173 | B1 * | 10/2001 | Mizuno et al. | 152/209.5 |
| 2006/0102266 | A1 * | 5/2006 | Ravasio et al. | 152/209.5 |
| 2007/0102083 | A1 * | 5/2007 | Hayashi | 152/209.5 |
| 2007/0137747 | A1 * | 6/2007 | Yoshida | 152/209.5 |
| 2009/0173420 | A1 * | 7/2009 | Katayama et al. | 152/209.5 |

(Continued)

FOREIGN PATENT DOCUMENTS

| CN | 101772427 A | 7/2010 |
| EP | 2 186 653 A1 | 5/2010 |

(Continued)

OTHER PUBLICATIONS

International Search Report for PCT/JP2008/064873, mailed on Nov. 11, 2008, 2 pages.

(Continued)

*Primary Examiner* — Steven D Maki
(74) *Attorney, Agent, or Firm* — Sughrue Mion, PLLC (57) ABSTRACT

A pneumatic tire for motorcycle capable of increasing peel resistance of a joint portion between regions against a larger lateral force when a camber angle is large, characterized in that each approximate straight line at a meridional section of join lines between a central tread rubber 7a and an intermediate tread rubber 7b and between the intermediate tread rubber 7b and a shoulder tread rubber 7c is extended obliquely in a direction of intersecting a phantom extended line of the each approximate straight line with the tire equatorial plane inside the tire, and an intersecting angle β of the approximate straight line $j_2$ of the join line between the intermediate tread rubber 7b and the shoulder tread rubber 7c with a tangential line drawn to a joint point of these tread rubbers at a ground contact surface and located at the side of the tire equatorial plane is smaller than an intersecting angle α of the approximate straight line $j_1$ of the join line between the central tread rubber 7a and the intermediate tread rubber 7b with a tangential line drawn to a joint point of these tread rubbers at the ground contact surface and located at the side of the tire equatorial plane.

2 Claims, 5 Drawing Sheets

(56) References Cited

U.S. PATENT DOCUMENTS

| | | | |
|---|---|---|---|
| 2010/0101694 A1* | 4/2010 | Ubukata et al. | 152/209.5 |
| 2010/0132862 A1* | 6/2010 | Terada | 152/209.5 |
| 2010/0200132 A1* | 8/2010 | Funahara et al. | 152/209.5 |

FOREIGN PATENT DOCUMENTS

| | | |
|---|---|---|
| JP | 61-27707 A | 2/1986 |
| JP | 2007-168531 A | 7/2007 |
| WO | 2007/055322 * | 5/2007 |
| WO | 2008/090837 * | 7/2008 |
| WO | 2008/093473 * | 8/2008 |

OTHER PUBLICATIONS

Chinese Office Action dated Apr. 24, 2012, issued in corresponding Chinese Patent Application No. 200880114743.4.

Extended European Search Report dated Mar. 28, 2012, issued in corresponding European Patent Application No. 08792594.7-2425.

* cited by examiner

PNEUMATIC TIRE FOR MOTORCYCLE

TECHNICAL FIELD

The present invention relates to a pneumatic tire for a motorcycle.

RELATED ART

In the cornering of the motorcycle tire, it is necessary to apply a camber angle to the tire so as to incline the tire with respect to a road surface, which is different from a tire for so-called four-wheel vehicles such as a passenger car, a truck, a bus and so on mainly giving a slip angle to the tire for cornering.

In the motorcycle tire, therefore, a ground contact area of a tread portion largely differs between straight running and cornering.

In the straight running, a central region of the tread portion including a tire equatorial plane contacts with a road surface and mainly functions to transmit a driving force and a braking force to the road surface, while in the cornering, a shoulder region including a tread ground contact end contacts with the road surface and mainly functions to receive a lateral force against a centrifugal force applied to the motorcycle. And, an intermediate region located between these regions functions to transmit a driving force and a braking force to the road surface, for example, in rise-up running at a corner, slalom running and the like and receive a lateral force against a centrifugal force in the cornering.

Therefore, if a single kind of rubber, a single rubber hardness or the like is merely selected as a tread rubber disposed in the ground contact area of the tread portion of the motorcycle tire, the functions as mentioned above can not be developed sufficiently in the respective regions of the ground contact area, so that the tread is preferable to have a five-region structure made from tread rubbers having properties in accordance with the intended purpose of each region.

Figure 5:
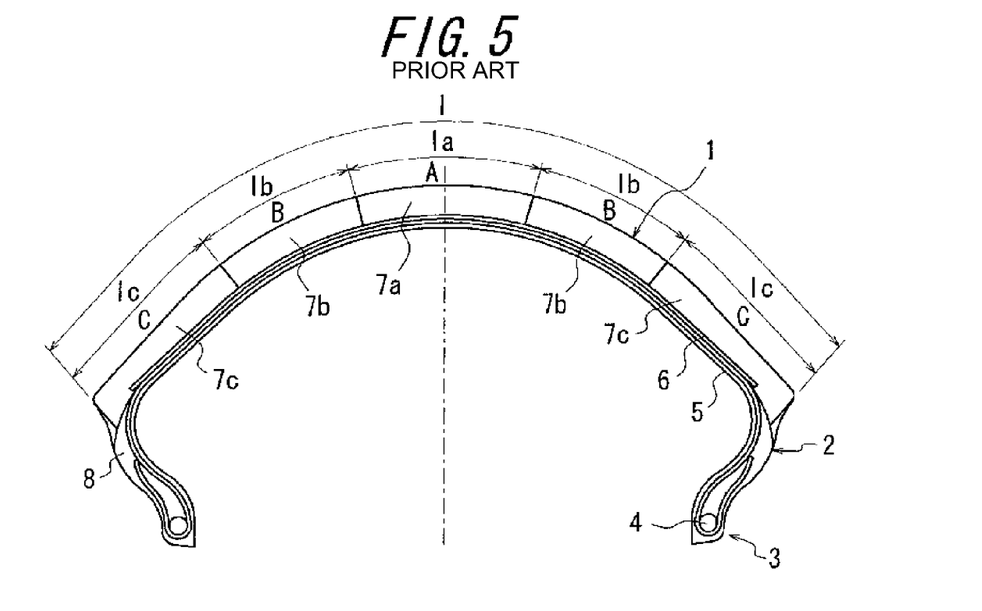
FIG. 5 is a meridional section view showing an embodiment of the conventional pneumatic tire for motorcycle.

For example, Patent Document 1 proposes a tire for a motorcycle wherein a tread portion comprises a central region, a pair of shoulder regions and a pair of intermediate regions each located between the central region and the shoulder region as shown by a meridional section view in FIG. 5, and a tread rubber in each of the central region, shoulder regions and intermediate regions is a crosslinked rubber composition, and a modulus of the rubber composition in the intermediate region is smaller than a modulus of the rubber composition in the central region and larger than a modulus of the rubber composition in the shoulder region.

Figure 6:
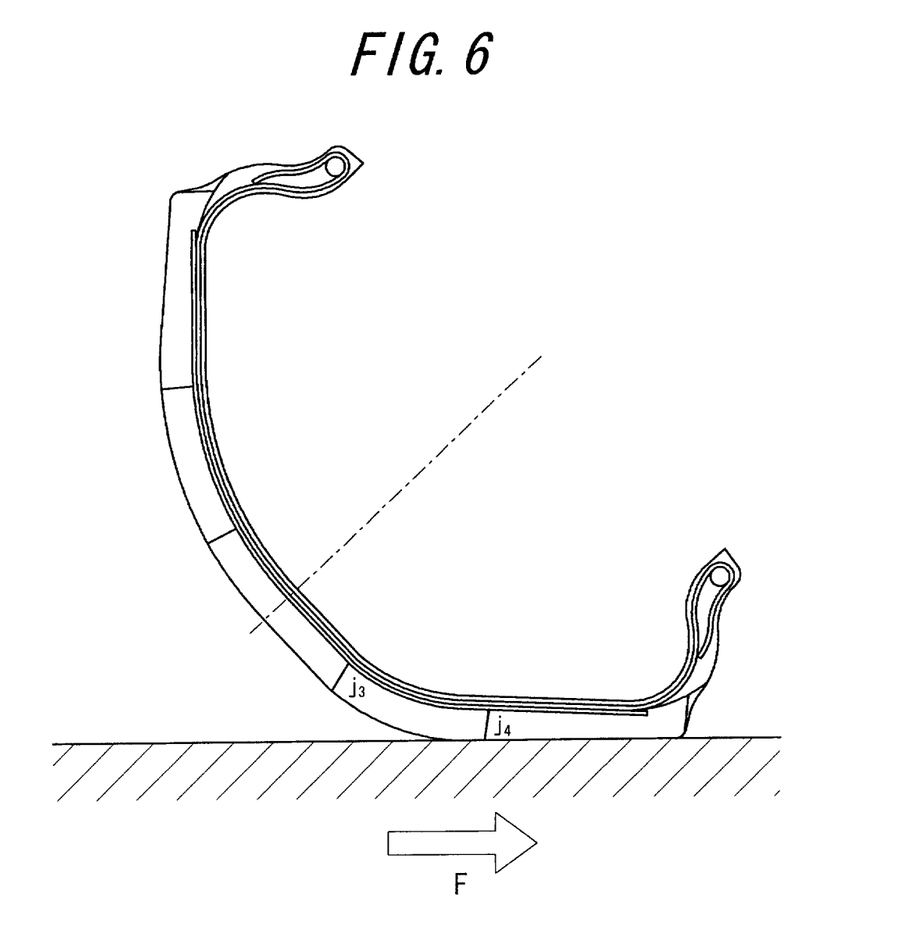
FIG. 6 is a meridional section view in the cornering of a tire shown FIG. 4.

In the tire for motorcycle described in Patent Document 1, however, all of a join line $j_3$ of a joint portion between the tread rubber of the central region and the tread rubber of the intermediate region and a join line $j_4$ of a joint portion between the tread rubber of the intermediate region and the tread rubber of the shoulder region are inclined at the same inclination angle in the meridional section view, so that if a camber angle is large as shown in FIG. 6, a peel resistance is deteriorated due to lateral force F applied to each joint portion of the tread.

Patent Document 1: JP-A-2007-168531

DISCLOSURE OF THE INVENTION

Problems to be Solved by the Invention

It is, therefore, an object of the present invention to provide a pneumatic tire for motorcycle wherein a peel resistance of a joint portion between the regions can be made large against more lateral force particularly when the camber angle is large.

Means for Solving Problem

The pneumatic tire for motorcycle according to the present invention comprises a tread portion including a tread rubber of one or more layer structure, a pair of sidewall portions continuously extending from each side of the tread portion inward in a radial direction of the tire and bead portions each continuing inward from the sidewall portion in the radial direction of the tire, characterized in that a ground contact area of the tread portion comprises five regions of a central region including a tire equatorial plane, a pair of shoulder regions each including a tread ground contact end and a pair of intermediate regions each located between the central region and the shoulder region, and each approximate straight line at a meridional section of a join line between a central tread rubber disposed all over the central region and an intermediate tread rubber disposed all over the intermediate region and a join line between the intermediate tread rubber disposed all over the intermediate region and a shoulder tread rubber disposed all over the shoulder regions is extended obliquely in a direction of intersecting a phantom extended line of the each approximate straight line with the tire equatorial plane inside the tire, and an intersecting angle of the approximate straight line of the join line between the intermediate tread rubber and the shoulder tread rubber with a tangential line drawn to a joint point of these tread rubbers at a ground contact surface and located at the side of the tire equatorial plane is smaller than an intersecting angle of the approximate straight line of the join line between the central tread rubber and the intermediate tread rubber with a tangential line drawn to a joint point of these tread rubbers at the ground contact surface and located at the side of the tire equatorial plane.

The term "tread rubber of one or more layer structure" used herein means a case that the tread rubber of the tread portion has a single layer structure but also includes a tread rubber of a multilayer structure such as a cap and base structure or the like.

And, the term "approximate straight line of join line in a meridional section of tire" used herein means that if the form of the join line is straight, it is applied as it is, and if the form is curve or the like, a straight line approximated in least square is applied.

The intersecting angle used herein means an angle under an air pressure (200–290 kPa) specified by the standards of JATMA (Japan Automobile Tire Manufacturers Association) YEAR BOOK, ETRTO (European Tyre and Rim Technical Organization) STANDARD MANUAL, TRA (THE TIRE and RIM ASSOCIATION INC.) YEAR BOOK and so on.

In such a tire, it is more preferable that the intersecting angle of the approximate straight line of the join line between the central tread rubber and the intermediate tread rubber with the tangential line drawn to the joint point of these tread rubbers at the ground contact surface and located at the side of the tire equatorial plane is a range of 35-60° and the intersecting angle of the approximate straight line of the join line between the intermediate tread rubber and the shoulder tread rubber with the tangential line drawn to the joint point of these tread rubbers at the ground contact surface and located at the side of the tire equatorial plane is a range of 20-40°.

Also, it is preferable that a periphery length of the central tread rubber at the ground contact surface in the meridional section of the tire is a range of 10-35% of an entire periphery length of the ground contact area, and a periphery length of the intermediate tread rubber at the ground contact surface is a range of 10-40% of the entire periphery length of the ground contact area, and a periphery length of the shoulder tread rubber at the ground contact surface is a range of 5-35% of the entire periphery length of the ground contact area.

The periphery length used herein means a range of a length measured along the tread surface under an air pressure (200-290 kPa) specified by JATMA or the like.

And now, the above-mentioned tires are preferable to be used as a tire to be mounted on a rear wheel of a motorcycle.

Effect of the Invention

In the pneumatic tire for motorcycle according to the present invention, when the ground contact area of the tread portion is separated into five regions of a central region including a tire equatorial plane, a pair of shoulder regions each including a tread ground contact end and a pair of intermediate regions each located between the central region and the shoulder region, the required rubber is used every the region, whereby rubber having optimum rubber properties in accordance with the use purpose can be disposed in the respective ground contact regions of the tread portion.

And, in the pneumatic tire for motorcycle according to the present invention, the intersecting angle of the approximate straight line of the join line between the intermediate tread rubber and the shoulder tread rubber with a tangential line drawn to a joint point of these tread rubbers at a ground contact surface and located at the side of the tire equatorial plane is made smaller than the intersecting angle of the approximate straight line of the join line between the central tread rubber and the intermediate tread rubber with a tangential line drawn to a joint point of these tread rubbers at the ground contact surface and located at the side of the tire equatorial plane, whereby a component of lateral force in a direction of peeling the joint point between the intermediate tread rubber and the shoulder tread rubber at the ground contact surface against the lateral force from the road surface through centrifugal force can be decreased in the shoulder tread rubber contacting with the road surface in the cornering having a large camber angle to improve the peel resistance.

BRIEF DESCRIPTION OF THE DRAWINGS

FIG. 3 (a) is a diagram illustrating a lateral force in a joint portion between a central tread rubber and an intermediate tread rubber in a tire shown in FIG. 2, and (b) is a diagram illustrating a lateral force in a joint portion between an intermediate tread rubber and a shoulder tread rubber in a tire shown in FIG. 2.

DESCRIPTION OF REFERENCE SYMBOLS

| | |
|---|---|
| 1 | tread portion |
| 2 | sidewall portion |

DESCRIPTION OF REFERENCE SYMBOLS -continued

| | |
|---|---|
| 3 | bead portion |
| 4 | bead core |
| 5 | carcass ply |
| 6 | belt |
| 7 | tread rubber |
| 7a | central tread rubber |
| 7b | intermediate tread rubber |
| 7c | shoulder tread rubber |
| 8 | side rubber |
| A | central region |
| B | intermediate region |
| C | shoulder region |

BEST MODE FOR CARRYING OUT THE INVENTION

A pneumatic tire for motorcycle according to the present invention will be described in detail with reference to the drawings below.

Figure 1:
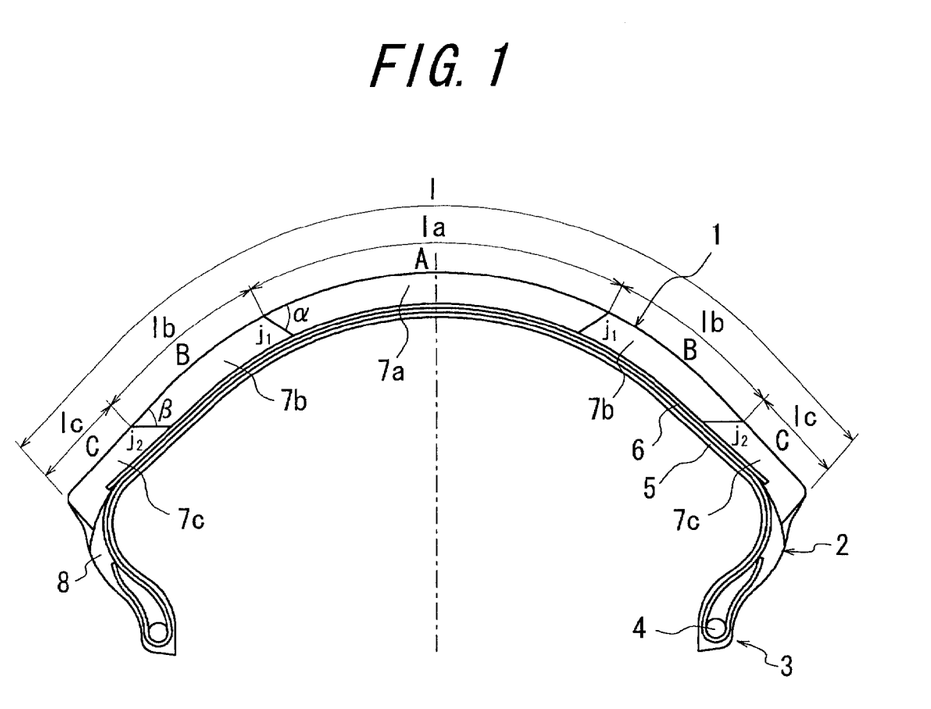
FIG. 1 is a meridional section view showing an embodiment of the pneumatic tire for motorcycle according to the present invention.

FIG. 1 is a meridional section view showing an embodiment of the pneumatic tire for motorcycle according to the present invention.

In this figure, numeral 1 is a tread portion, numeral 2 a pair of sidewall portions continuously extending from each side of the tread portion 1 inward in a radial direction, and numeral 3 a bead portion continuing inward from the sidewall portion 2 in the radial direction.

The tire comprises a carcass ply 5 extending from the tread portion 1 through the side wall portions 2 to the bead portions 3 and turning around the bead cores 4. Although the illustrated carcass consists of one carcass ply 5, a carcass may be comprised of plural carcass plies.

A belt 6 consisting of at least one circumferential reinforcing cord layer is disposed on an outer circumferential side of a crown region of the carcass ply 5. For example, this belt 6 may be a so-called spiral belt structure that one or plural cords are continuously wound at a posture of extending in the circumferential direction of the tire.

On an outer circumferential side of the belt 6 is further disposed a tread rubber 7 extending between positions of tire maximum width in an arc and forming a ground contact area of the tread portion 1. And also, a side rubber 8 forming the side portion is disposed on each side of the tread rubber 7.

In addition, predetermined grooves are formed on the surface of the tread rubber 7 though they are omitted in FIG. 1.

In the illustrated tire, the ground contact area of the tread portion 1 is constituted with five regions of a central region A including a tire equatorial plane in its center, shoulder regions C each including a tread ground contact end and intermediate regions B each located between the central region A and the shoulder region C. The shoulder regions C and the intermediate regions B respectively form a pair in symmetrical positions with respect to the equatorial plane.

At this moment, the tread rubber 7 disposed in these regions has a single layer structure. A periphery length $l_a$ of an outer surface of a central tread rubber 7a disposed all over the central region A is within a range of 10-35% of an entire periphery length l of the ground contact area, and a periphery length $l_b$ of an outer surface of an intermediate tread rubber 7b disposed all over the intermediate region B is within a range of 10-40% of the entire periphery length l of the ground contact area, and a periphery length $l_c$ of an outer surface of a shoulder tread rubber 7c disposed all over the shoulder region C is within a range of 5-35% of the entire periphery length l of the ground contact area.

Figure 2:
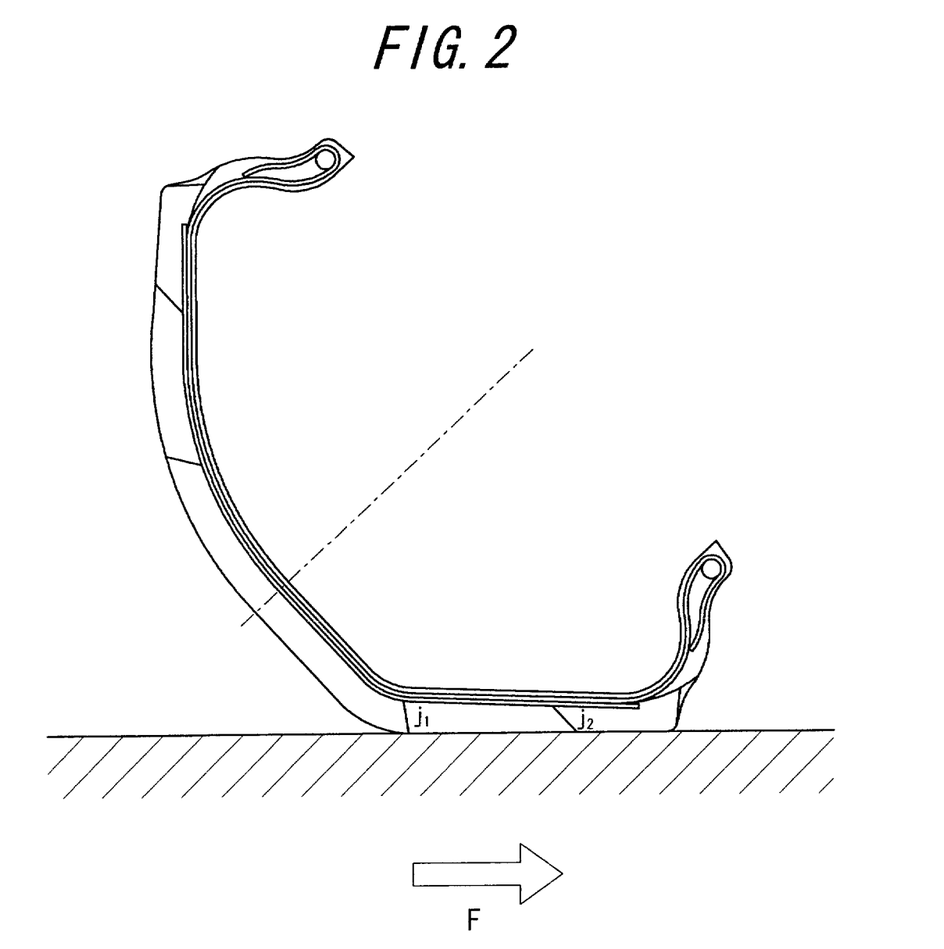
FIG. 2 is a meridional section view in the cornering of the tire shown in FIG. 1.
Figure 3:
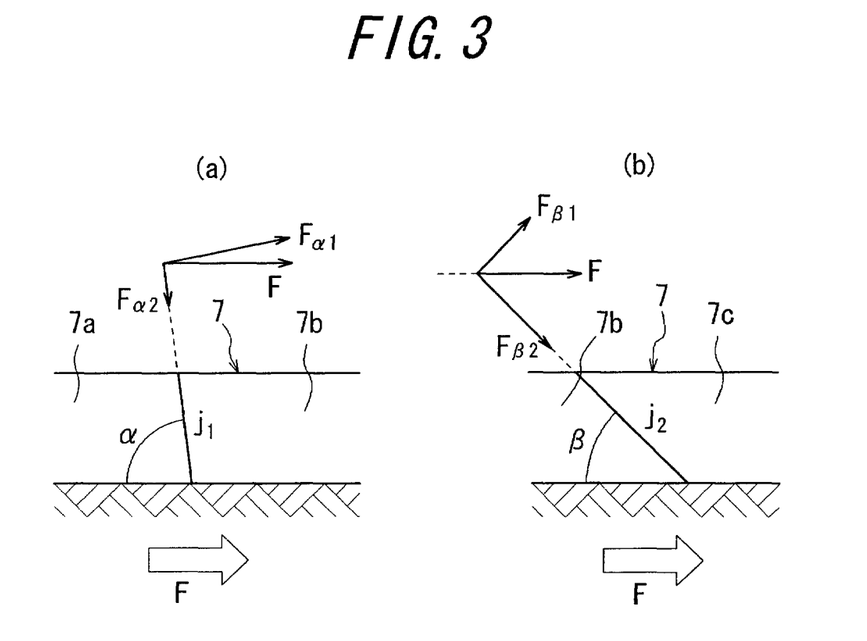

In the pneumatic tire for motorcycle, a phantom extension segment of an approximate straight line of a join line $j_1$ between the central tread rubber 7a and the intermediate tread rubber 7b and a phantom extension segment of an approximate straight line of a join line $j_2$ between the intermediate tread rubber 7b and the shoulder rubber 7c are extended obliquely in a direction of intersecting with the tire equatorial plane inside the tire, while an intersecting angle β of the approximate straight line $j_2$ of the join line between the intermediate tread rubber 7b and the shoulder tread rubber 7c with a tangential line drawn to a joint point of these tread rubbers at a ground contact surface and located at the side of the tire equatorial plane is made smaller than an intersecting angle α of the approximate straight line $j_1$ of the join line between the central tread rubber 7a and the intermediate tread rubber 7b with a tangential line drawn to a joint point of these tread rubbers at the ground contact surface and located at the side of the tire equatorial plane. Thus, when a lateral force F is applied to the shoulder tread rubber 7c contacting with a road surface in the cornering of a large camber angle as shown FIG. 2 through centrifugal force, component $F_p$, of the lateral force F in a direction of peeling a joint point between the intermediate tread rubber 7b and the shoulder tread rubber 7c at the ground contact surface as shown in FIG. 3(b) is made lower than component $F_{α1}$ of the lateral force F in a direction of peeling a joint point between the central tread rubber 7a and the intermediate tread rubber 7b as shown in FIG. 3(a), whereby peel resistance can be improved.

More preferably, the intersecting angle α of the approximate straight line $j_1$ of the join line between the central tread rubber 7a and the intermediate tread rubber 7b with a tangential line drawn to a joint point of these tread rubbers at the ground contact surface is made within a range of 35-60°, whereby the optimization of running the five-region tread can be attained while suppressing the deterioration of handling responsibility due to stiffness dump.

When the intersecting angle is less than 35°, an amount of entering the tread rubber 7 of each region into its adjacent region becomes large and there is a tendency that the performance of the five-region tread can not be developed. While when it exceeds 60°, the stiffness dump is increased and the handling responsibility tends to be deteriorated.

In addition, the intersecting angle β of the approximate straight line $j_2$ of the join line between the intermediate tread rubber 7b and the shoulder tread rubber 7c with a tangential line drawn to a joint point of these tread rubbers at a ground contact surface and located at the side of the tire equatorial plane is made within a range of 20-40°, whereby the optimization of running the five-region tread can be attained while suppressing the deterioration of handling responsibility due to stiffness dump.

When the intersecting angle is less than 20°, an amount of entering the tread rubber 7 of each region into its adjacent region becomes large and there is a tendency that the performance of the five-region tread can not be developed. While when it exceeds 40°, the stiffness dump is increased and the handling responsibility is deteriorated, and the peer durability to the lateral force F tends to be lacking.

It is further preferable that the periphery length $l_a$ of the outer surface of the central tread rubber 7a is a range of 10-35% of the entire periphery length l of the ground contact area, and the periphery length $l_b$ of the outer surface of the intermediate tread rubber 7b is a range of 10-40% of the entire periphery length l of the ground contact area, and the periphery length $l_c$ of the outer surface of the shoulder tread rubber 7c is a range of 5-35% of the entire periphery length l of the ground contact area, and hence optimum rubber properties can be applied to the respective ground contact region of the tread portion 1.

When the periphery length $l_a$ of the central tread rubber 7a at the ground contact surface is less than 10% of the entire periphery length l of the ground contact area, the intermediate tread rubber 7b enters into the vicinity of the central region A and there is a tendency that the performances inherent to the five-region tread can not be developed. While, when it exceeds 35%, the central tread rubber 7a enters into the vicinity of the intermediate region B and there is a tendency that the performances inherent to the five-region tread can not be developed.

When the periphery length $l_b$ of the intermediate tread rubber 7b at the ground contact surface is less than 10% of the entire periphery length l of the ground contact area, the central tread rubber 7a or the shoulder tread rubber 7c enters into the vicinity of the intermediate region B and there is a tendency that the performances inherent to the five-region tread can not be developed. While, when it exceeds 35%, the intermediate tread rubber 7b enters into the vicinity of the central region A or the intermediate region B and there is a tendency that the performances inherent to the five-region tread can not be developed.

When the periphery length $l_c$ of the shoulder tread rubber 7c at the ground contact surface is less than 5% of the entire periphery length l of the ground contact area, the intermediate tread rubber 7b enters into the vicinity of the shoulder region C and there is a tendency that the performances inherent to the five-region tread can not be developed. While, when it exceeds 35%, the shoulder tread rubber 7c enters into the vicinity of the intermediate region B and there is a tendency that the performances inherent to the five-region tread can not be developed.

Since a rear-wheeled tire is a driving wheel in a motorcycle, it is preferable that the present invention is applied to a tire to be mounted on the rear wheel.

Example 1

Figure 4:
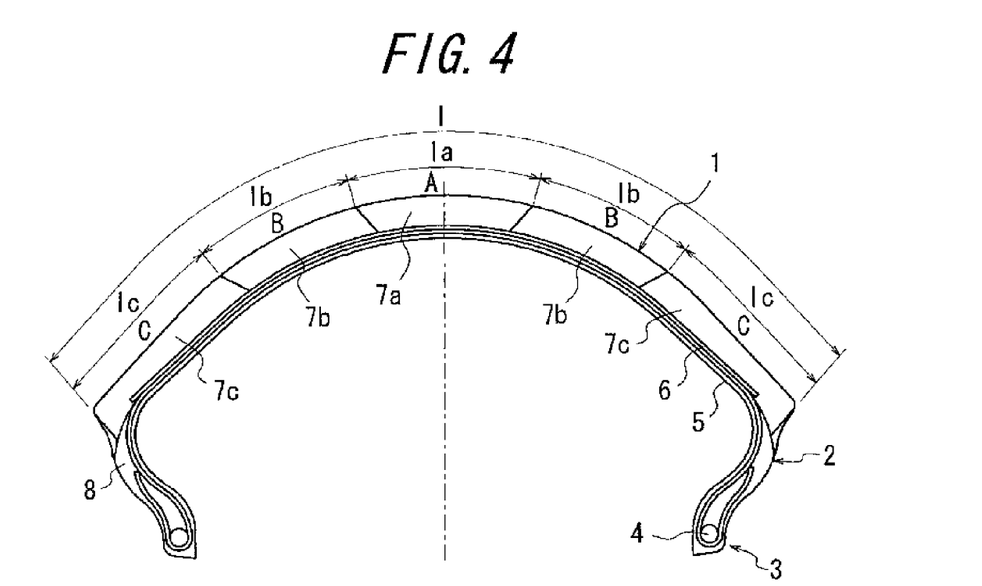
FIG. 4 is a meridional section view showing a comparative example of a pneumatic tire for motorcycle.

There are prepared Example tires 1-3 having a structure as shown in FIG. 1 and a rear tire size of 190/50ZR17 and comprising one steel monofilament spiral belt and two nylon carcass plies and Comparative Example tires 1-5 having a structure as shown in FIG. 4, in which respective parameters are varied as shown in Tables 1-2 to evaluate peel durability of each tire.

Moreover, a tire for a front wheel has a size of 120/70ZR17 and comprises one steel monofilament spiral belt and two rayon carcass plies.

In the present invention, the tire structure other than the tread portion is substantially the same as in the conventional pneumatic tire for motorcycle since its modification is not required.

TABLE 1

|  | Intersecting angle α (°) | Intersecting angle β (°) |
|---|---|---|
| Example tire 1 | 45 | 25 |
| Example tire 2 | 45 | 30 |
| Example tire 3 | 60 | 35 |
| Example tire 4 | 45 | 25 |
| Comparative Example tire 1 | — | — |
| Comparative Example tire 2 | 60 | 70 |
| Comparative Example tire 3 | 40 | 50 |
| Comparative Example tire 4 | 45 | 45 |
| Comparative Example tire 5 | 45 | 45 |

TABLE 2

| | Periphery length $l_a$ of central tread rubber (%) | Periphery length $l_b$ of intermediate tread rubber (%) | Periphery length $l_c$ of shoulder tread rubber (%) |
|---|---|---|---|
| Example tire 1 | 25 | 18.5 | 18 |
| Example tire 2 | 25 | 18.5 | 18 |
| Example tire 3 | 25 | 18.5 | 18 |
| Example tire 4 | 20 | 30 | 10 |
| Comparative Example tire 1 | — | — | — |
| Comparative Example tire 2 | 25 | 18.5 | 18 |
| Comparative Example tire 3 | 25 | 18.5 | 18 |
| Comparative Example tire 4 | 40 | 25 | 5 |
| Comparative Example tire 5 | 5 | 7.5 | 40 |

TABLE 3

| | Example tire 1 | Example tire 2 | Example tire 3 | Example tire 3 | Comparative Example tire 1 | Comparative Example tire 2 | Comparative Example tire 3 | Comparative Example tire 4 | Comparative Example tire 5 |
|---|---|---|---|---|---|---|---|---|---|
| Peel resistance | 100 | 100 | 100 | 100 | 100 | 95 | 95 | 95 | 100 |
| Gripping property | 120 | 120 | 120 | 110 | 100 | 115 | 110 | 90 | 105 |
| Handling performance | 120 | 115 | 110 | 115 | 100 | 90 | 95 | 105 | 95 |

(Peel Resistance)

Each of Example tires 1 to 4 and Comparative Example tires 1 to 5 is mounted on a rim having a rim size of MT6.00 under an internal pressure of 290 kPa and run repeatedly at a camber angle of 0-40° on a circuit course with a running distance of 5 km under a load of 150 kg at a test speed of 100-250 km/h, and thereafter the peel durability is evaluated from a state of a joint portion to obtain a result as shown in Table 3.

It is represented by an index on the basis that the value of Comparative Example tire 1 is 100. The larger the numerical value, the better the result.

Example 2

With respect to each of Example tires 1 to 4 and Comparative Example tires 1 to 5 is evaluated the gripping property as described below.

(Gripping Property)

Each of Example tires 1-4 and Comparative Example tires 1-5 is mounted on a rim having a rim size of MT6.00 under an internal pressure of 290 kPa and run repeatedly at a camber angle of 0-40° on a circuit course with a running distance of 5 km under a load of 150 kg at a test speed of 100-250 km/h, during which the gripping property is evaluated by a feeling of a test rider to obtain a result as shown in Table 3.

It is represented by an index on the basis that the value of Comparative Example tire 1 is 100. The larger the numerical value, the better the result.

Example 3

With respect to each of Example tires 1-4 and Comparative Example tires 1-5 is evaluated the handling performance as described below.

(Handling Performance)

Each of Example tires 1-4 and Comparative Example tires 1-5 is mounted on a rim having a rim size of MT6.00 under an internal pressure of 290 kPa and run repeatedly at a camber angle of 0-40° on a circuit course with a running distance of 5 km under a load of 150 kg at a test speed of 100-250 km/h, during which the handling performance is evaluated by a feeling of a test rider to obtain a result as shown in Table 3.

It is represented by an index on the basis that the value of Comparative Example tire 1 is 100. The larger the numerical value, the better the result.

As seen from the results of Table 3, Example tires 1 to 4 may have concurrently the peel durability, gripping property and handling performance as compared with Comparative Example tires 1 to 5.

The invention claimed is:

1. A pneumatic tire for motorcycle comprising a tread portion including a tread rubber, a pair of sidewall portions continuously extending from each side of the tread portion inward in a radial direction of the tire and bead portions each continuing inward from the sidewall portion in the radial direction of the tire, characterized in that a ground contact area of the tread portion comprises five regions of a central region including a tire equatorial plane, a pair of shoulder regions each including a tread ground contact end and a pair of intermediate regions each located between the central region and the shoulder region, and each approximate straight line at a meridional section of a join line between a central tread rubber disposed all over the central region and an intermediate tread rubber disposed all over the intermediate region and a join line between the intermediate tread rubber disposed all over the intermediate region and a shoulder tread rubber disposed all over the shoulder regions is extended obliquely in a direction of intersecting a phantom extended line of the each approximate straight line with the tire equatorial plane inside the tire, and an intersecting angle of the approximate straight line of the join line between the intermediate tread rubber and the shoulder tread rubber with a tangential line drawn to a joint point of these tread rubbers at a ground contact surface and located at the side of the tire equatorial plane is smaller than an intersecting angle of the approximate straight line of the join line between the central tread rubber and the intermediate tread rubber with a tangential line drawn to a joint point of these tread rubbers at the ground contact surface and located at the side of the tire equatorial plane, wherein a periphery length of the central tread rubber at the ground contact surface in the meridional section of the tire is a range of 10-35% of an entire periphery length of the ground contact area, and a periphery length of the intermediate tread rubber at the ground contact surface is a range of 10-40% of the entire periphery length of the ground contact area, and a periphery length of the shoulder tread rubber at the ground contact surface is a range of 5-35% of the entire periphery length of the ground contact area, and each respective regions has a single layer structure such that the join lines between the respective regions are the only join lines, wherein each of the central tread rubber, the shoulder tread rubber and the intermediate tread rubber comprises different rubber composition.

2. A pneumatic tire for motorcycle according to claim 1, wherein the intersecting angle of the approximate straight line of the join line between the central tread rubber and the intermediate tread rubber with the tangential line drawn to the joint point of these tread rubbers at the ground contact surface and located at the side of the tire equatorial plane is a range of 35-60° and the intersecting angle of the approximate straight line of the join line between the intermediate tread rubber and the shoulder tread rubber with the tangential line drawn to the joint point of these tread rubbers at the ground contact surface and located at the side of the tire equatorial plane is a range of 20-40°.

* * * * *